No. 696,264. Patented Mar. 25, 1902.
H. E. PARSONS & H. C. DERR.
AUTOMATIC RETAINING VALVE FOR USE IN AUTOMATIC FLUID PRESSURE BRAKE SYSTEMS.
(Application filed Oct. 16, 1901.)
(No Model.)
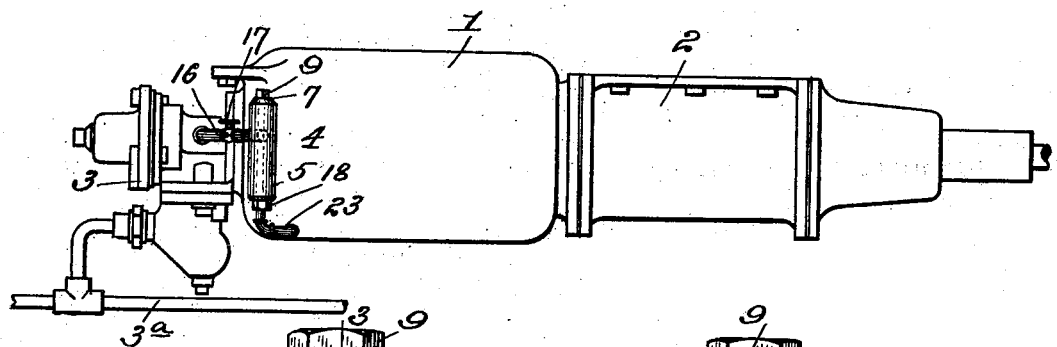
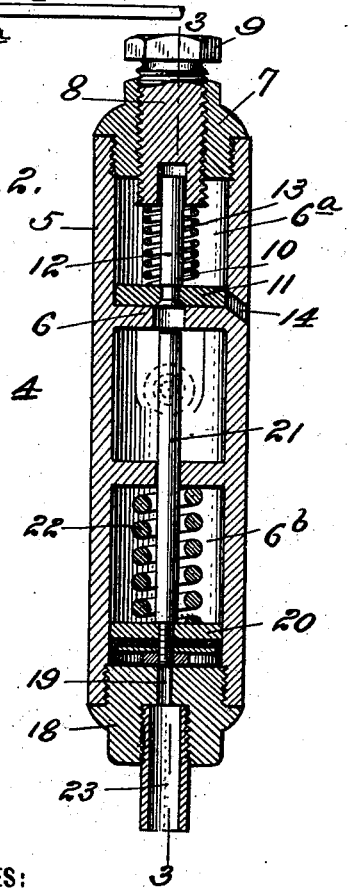
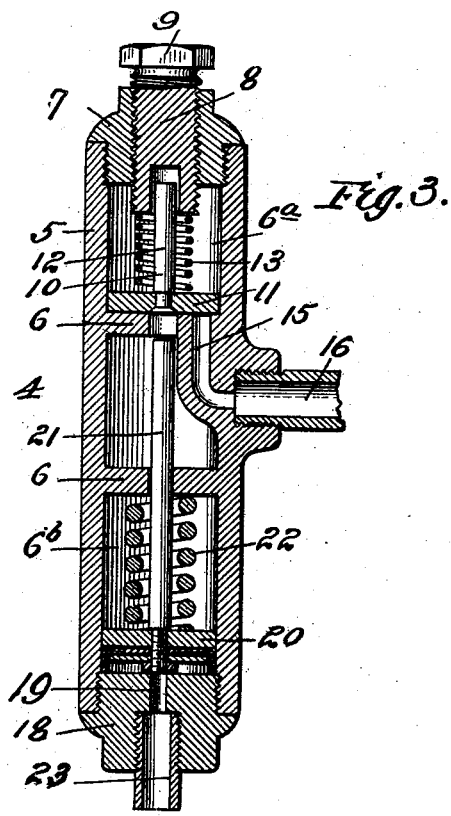
WITNESSES:
Elmer Seavey
T. C. Glorius
INVENTORS:
Harry E. Parsons
Husto C. Derr
BY
Davis & Davis,
ATTORNEYS.
THE NORRIS PETERS CO., PHOTO-LITHO., WASHINGTON, D. C.

UNITED STATES PATENT OFFICE.

HARRY E. PARSONS AND HEISTER C. DERR, OF NESCOPECK, PENNSYLVANIA; SAID DERR ASSIGNOR OF ONE-HALF OF HIS RIGHT TO JEROME W. PIFER, OF NESCOPECK, PENNSYLVANIA.

AUTOMATIC RETAINING-VALVE FOR USE IN AUTOMATIC FLUID-PRESSURE BRAKE SYSTEMS.

SPECIFICATION forming part of Letters Patent No. 696,264, dated March 25, 1902.

Application filed October 16, 1901. Serial No. 78,854. (No model.)

*To all whom it may concern:*

Be it known that we, HARRY E. PARSONS and HEISTER C. DERR, citizens of the United States, residing at Nescopeck, county of Luzerne, State of Pennsylvania, have invented certain new and useful Improvements in Automatic Retaining-Valves for Use in Automatic Fluid-Pressure Brake Systems, of which the following is a specification, reference being had to the accompanying drawings, in which—

Figure 1 is a side elevation showing the triple valve, auxiliary reservoir, the brake-cylinder, and the retaining-valve connected to the triple valve and the auxiliary reservoir. Fig. 2 is a vertical sectional view of the retaining-valve; and Fig. 3 is a similar view of the retaining-valve, taken in the line 3 3 of Fig. 2.

Our invention relates to fluid-pressure brakes for railway-trains, and is especially adapted for use in connection with the well-known Westinghouse automatic air-brake system.

In arriving at a clear understanding of our invention a brief resumé of the Westinghouse system will be helpful. An air-pump on the locomotive supplies compressed air at a pressure of ninety pounds to a main reservoir on the locomotive or tender, from which the air is led through a controlling-valve in the cab (the engineer's valve) to a train-pipe connected with auxiliary reservoirs located under the cars. A triple valve controls the flow of air from the train-pipe to each auxiliary reservoir and from the reservoir to the brake-cylinder, the valve being so constructed that when the air-pressure in the train-pipe is at its normal—seventy pounds—the triple valve opens communication between the train-pipe and the auxiliary reservoir and closes the passage from the reservoir to the brake-cylinder, the latter being opened to the atmosphere through an exhaust-port in the triple valve. To apply the brakes, the engineer reduces the train-pipe pressure, which causes the triple valve to cut off the reservoir from the train-pipe, connect the reservoir with the brake-cylinder, and close the exhaust. This operation of course draws part of the air from the auxiliary reservoir into the brake-cylinder, and this loss can only be made up by a fresh supply from the main reservoir; but in order to recharge the auxiliary reservoir the triple valve must be moved to connect said reservoir with the train-pipe, and when the valve is so moved it opens the exhaust and allows the air in the brake-cylinder to escape. It is therefore impossible in the Westinghouse system as commonly constructed and used to recharge the auxiliary reservoir and yet keep the brakes set. To be able to do this is frequently very desirable where a great many stops have to be made in quick succession or where a long grade requires a constant application of the brakes for a considerable time, in which case the auxiliary-reservoir pressure may fall so low by leakage as to be unable to hold the train.

The object of our invention is to provide means for refilling the auxiliary reservoir in automatic fluid-pressure railway-brake systems without releasing the brakes; and to this end it consists of a pressure-retaining valve controlling the escape of air from the brake-cylinder, which pressure-retaining valve is operated from the locomotive by the engineer for the purpose of opening the brake-cylinder exhaust-port.

By "pressure-retaining valve" we mean a valve which acts to retain in the brake-cylinder a certain pressure of air, which would be allowed to escape when the train-pipe pressure is increased for the purpose of recharging the auxiliary reservoirs if the escape-port were not controlled by the pressure-retaining valve.

Referring to the various parts by numerals, 1 designates the auxiliary reservoir; 2, the brake-cylinder; 3, the triple-valve mechanism, and 3ª the train-pipe.

The pressure-controlling mechanism 4 is in communication with the exhaust-port or "brake-release" port of the triple valve and with the auxiliary reservoir, and consists of the vertical casing 5, having a compartment at each of its ends, said compartments being formed by transverse partitions 6. One end of the casing is closed by a head 7, which is threaded into the casing, and said head is formed with a central longitudinal passage, which is threaded to receive the threaded stem 8 of the pressure-regulating device 9. Within the compartment 6ª, formed between the head 7 and the adjacent partition 6, is mounted the brake-cylinder-pressure-regulating valve 10. This valve consists of the head 11, which seats on the partition 6 and carries a central stem 12, whose free end is guided in a central recess in the inner end of the stem 8 of the pressure-regulating device 9. Surrounding the valve-stem and bearing against the head of the valve and the end of the stem 8 is a light coil-spring 13. This spring is adjusted by means of the stem 8 to resist any desired pressure on the valve-head, usually fifteen pounds. Through the side of the casing is formed an outlet-port 14, which communicates with the compartment 6ª, flush with the surface of the partition 6, so that air will exhaust through the said port immediately on forcing the valve from its seat on the partition 6. Opening into this compartment through the partition 6 is an inlet-port 15, which is closed by the valve 10. Communicating with this port and with the exhaust-port of the triple valve is a pipe 16, which is provided with a three-way valve 17, by which the air from the triple valve may be exhausted into the atmosphere or be caused to flow through the pipe 16 to compartment 6ª. The other end of the casing contains a valve-opening mechanism and it is closed by a head 18, which is threaded therein, and is provided with a central inlet-port 19, which communicates with the compartment 6ᵇ, formed between the head and the adjacent partition 6. Seated on the inner surface of the head 18 is an air-tight plunger-valve 20, which carries a central stem 21, said stem being guided through central openings in the partitions 6 and extending into close proximity to the head 11 of the valve 10. Within the compartment 6ᵇ is a heavy coil-spring 22, which surrounds the stem of the valve 20 and bears at one of its ends against the adjacent partition and at its other end against the valve 20 to hold said valve to the end of the head against a pressure of seventy pounds. The port 19 of the head 18 is placed in communication with the auxiliary reservoir by means of a pipe 23, so that whatever pressure there may be in said auxiliary reservoir will be exerted to lift the valve 20. It will of course be understood that the spring 22 may be designed to resist any desired pressure on the valve 20. It will also be noted that the pipe 23 may be connected to the train-pipe or at any point to receive the main pressure, if desired, instead of to the auxiliary reservoir, in which case there would be a quicker brake-releasing action, as the pressure in the train-pipe reaches seventy pounds before that pressure is attained in the auxiliary reservoirs.

The operation is as follows: Air is admitted in the usual way by the engineer into the train-pipe and auxiliary reservoirs. When it is desired to apply the brakes, air is exhausted from the train-pipe by the engineer and air from the auxiliary reservoir flows through the triple valve into the brake-cylinder to apply the brakes. With the ordinary brake mechanism now in use it is impossible to maintain this pressure in the brake-cylinder while recharging the auxiliary reservoir. With the retaining-valve described, however, the desired pressure may be maintained in the brake-cylinder during the recharging of the auxiliary reservoir. As the release-port of the triple valve exhausts under the valve 10 it is evident that said valve will retain fifteen pounds in the brake-cylinder when the release-port of the triple valve is opened by the air flowing through the triple valve to the auxiliary reservoir when recharging. The pressure may be increased in the auxiliary reservoir to near seventy pounds (the strength of the spring 22) without releasing the fifteen pounds held in the brake-cylinder by the spring 13. By this means the auxiliary reservoir may be recharged as often as necessary without releasing the brakes.

When it is desired to release the brakes, the air-pressure in the auxiliary reservoir is raised to seventy pounds. This pressure is sufficient to compress spring 22 sufficiently to raise valve 20 and cause the stem 21 to contact with valve-head 11 and raise it from its seat, thereby permitting air to exhaust from the release of the triple valve through pipe 16, ports 15 and 14 to the atmosphere.

When it is necessary to stop at a depot or at a water-tower, or, in fact, any place where a quick release is necessary, it requires a reduction in train-pipe pressure of twenty-five pounds. As twenty-five pounds excess pressure is always carried in main reservoir, (sometimes this excess pressure amounts to thirty-five or forty pounds,) it will be noted that there is sufficient pressure to release immediately. If the pressure be reduced thirty pounds and there is twenty-five pounds excess pressure, the instant the reduction is made the pumps start and gain the required pressure at once.

By opening the valve 17 the air from the triple-valve release may be exhausted directly into the atmosphere.

It will be noted that our retaining-valve forms absolutely no obstruction to the quick application of the brakes, and as the auxiliary reservoir may be charged to nearly seventy pounds while the brakes are held applied it will be readily seen that after this pressure has been attained the brakes may be quickly released when desired by increasing the pressure slightly to compress spring 22. By thus providing a spring-pressed valve for maintaining a pressure in the brake-cylinder and a release for said valve, which is operated by a predetermined pressure, the auxiliary reservoir or train-pipe, it will be seen that after the apparatus is once charged and the brakes applied there will always be a sufficient pressure maintained in the auxiliary cylinders to apply the brakes, it being necessary to produce this pressure therein before the brakes can be released.

Having thus described our invention, what we claim as new, and desire to secure by Letters Patent, is—

1. In an automatic fluid-pressure brake system, the combination of an auxiliary reservoir, a triple valve, a fluid-pressure-retaining means consisting of a valve-chamber formed with an inlet-port and an outlet-port, a valve in said chamber and normally closing said ports, means for connecting the release-port of the triple valve with the inlet to said chamber, means for causing said valve to resist a predetermined pressure from the release-port of the triple valve, and a valve-opening mechanism consisting of a tubular casing formed with a port at one end, a plunger-valve therein and closing said port, means for placing said port in communication with the auxiliary-reservoir pressure, a stem carried by said plunger-valve and adapted to move the brake-cylinder-pressure-regulating valve, and means for causing the plunger-valve to resist the auxiliary-reservoir pressure until a predetermined pressure is reached, substantially as described.

2. In an automatic fluid-pressure brake system, the combination of an auxiliary reservoir, a triple valve, a fluid-pressure-retaining means consisting of a valve-chamber formed with an inlet-port and an outlet-port, a valve in said chamber and normally closing said ports, means for connecting the release-port of the triple valve with the inlet to said chamber, means for causing said valve to resist a pressure from the release-port of the triple valve, means for varying the resistance of the valve, and a valve-opening mechanism consisting of a tubular casing formed with a port at one end, a plunger-valve therein and closing said port, means for placing said port in communication with the auxiliary reservoir, a stem carried by said valve and adapted to move the pressure-regulating valve, and means for causing the plunger-valve to resist the auxiliary-reservoir pressure until a predetermined pressure is reached, substantially as described.

3. A pressure-controlling mechanism consisting of a valve-chamber formed with an inlet-port and an outlet-port, a valve therein closing said ports, means for placing its inlet-port in communication with the release-port of a triple valve, means for causing said valve to resist a predetermined pressure from the triple valve, and a valve-opening mechanism consisting of a casing formed with a port, a plunger-valve therein closing said port, means for causing said valve to resist a predetermined pressure, a device carried by the plunger-valve and normally out of engagement with the pressure-retaining valve and adapted to be moved to engage the pressure-regulating valve, to move it when the plunger-valve is moved.

4. A pressure-controlling mechanism consisting of a tubular casing formed with a valve-chamber at one end having an inlet and an outlet port, a valve therein closing said ports, means for connecting the inlet-port to the release-port of a triple valve, means for causing said valve to resist a predetermined pressure from said release-port, a valve-chamber at the other end of said casing and provided with a port, an air-tight plunger-valve in said casing and closing the port, means for connecting said port to the auxiliary reservoir, means for causing said plunger to resist a predetermined pressure from the auxiliary reservoir, and a device connected to the plunger-valve and adapted to move the pressure-regulating valve when an excessive pressure is reached in the auxiliary reservoir.

5. A pressure-controlling mechanism consisting of a valve-chamber formed with an inlet-port and an outlet-port, a pressure-retaining valve therein closing said ports, a valve-opening mechanism consisting of a casing formed with an inlet-port, a piston therein closing said port, the pressure-retaining valve being free to move independent of the piston, means for holding the piston and the pressure-retaining valve to their seats by differential pressure devices, and a device normally out of engagement with the pressure-retaining valve and adapted to be moved by the piston to raise the pressure-retaining valve from its seat to open the outlet-port of the pressure-retaining-valve chamber.

6. In an automatic fluid-pressure brake system, the combination of an auxiliary reservoir, a triple valve, a fluid-pressure-retaining means consisting of a valve-chamber formed with an inlet-port and an outlet-port, a pressure-retaining valve in said chamber and normally closing said ports, means for connecting the release-port of the triple valve with the inlet to said chamber, and a valve-opening mechanism consisting of a tubular casing formed with a port at one end, a plunger therein closing said port, means for placing said port in communication with the main pressure, differential pressure devices for holding the pressure-retaining valve and the piston-valve to their seats, the pressure-retaining valve being movable independently of the piston-valve, and a device normally out of engagement with the pressure-retaining valve and moved by the piston-valve to engage and raise the pressure-retaining valve from its seat.

7. A pressure-controlling mechanism consisting of a tubular casing formed with a valve-chamber at one end having an inlet and an outlet port, a pressure-retaining valve therein closing said ports, a valve-chamber at the other end of said casing and provided with an inlet-port, a plunger-valve in said casing and closing the port, differential pressure devices for holding the pressure-retaining valve and the plunger-valve to their seats, the pressure-retaining valve being movable independently of the plunger-valve and a device connected to the plunger-valve and normally out of engagement with the pressure-retaining valve and adapted to lift the pressure-retaining valve from its seat when the plunger-valve is moved.

In testimony whereof we hereunto affix our signatures, in the presence of two witnesses, this 9th day of October, 1901.

HARRY E. PARSONS.
    HEISTER C. DERR.

Witnesses:
 ALEX. C. JACKSON,
 JOHN W. EVANS.